United States Patent [19]

Farrah

[11] Patent Number: 5,180,305
[45] Date of Patent: Jan. 19, 1993

[54] PROCESS COLOR SEPARATION GUIDE FOR COLOR TRANSPARENCIES

[76] Inventor: Ronald P. Farrah, 5219 42nd St., NW., Washington, D.C. 20015-1931

[21] Appl. No.: 498,686

[22] Filed: Mar. 26, 1990

[51] Int. Cl.⁵ .............................................. G09B 19/00
[52] U.S. Cl. .................................................... 434/102
[58] Field of Search ........................................ 434/102

[56] References Cited

U.S. PATENT DOCUMENTS

| | | | |
|---|---|---|---|
| 799,609 | 9/1905 | Ludwig | 434/102 |
| 1,880,026 | 9/1932 | Singerman | 434/102 |
| 2,120,499 | 6/1938 | Mackay | 434/102 |
| 2,891,323 | 6/1959 | Eckstein et al. | 434/102 |
| 2,941,312 | 6/1960 | Mattucci | 434/102 |
| 3,088,226 | 5/1963 | Watterson et al. | 434/102 |
| 3,425,138 | 2/1969 | Balinkin | 434/102 |

*Primary Examiner*—Richard J. Apley
*Assistant Examiner*—Karen A. Richard

[57] ABSTRACT

Color printing is a precise and exacting science. The finished piece should be a perfect meld between type and graphic. To accomplish this, a color chart must be used to match a particular color in the photograph or in a slide, as is more commonly used. The match is then incorporated in the headline or body copy. When using a photograph, it is fairly simple to pick and match a color from the chart because they are both reflective. But working with the reflective chart and the transparency, the slide poses a problem. The designer has to visualize and interpolate. With this invention, the chart and slide is transparent. In this invention, the four colors, magenta, cyan, yellow, and black with screens from ten percent to 90 percent for each are selected to match a particular color or a complement of all the colors in the slide. By overlaying any one or more of the primary colors and/or their screens, the designer can specify those colors for the headline, body copy, or a frame.

6 Claims, 1 Drawing Sheet

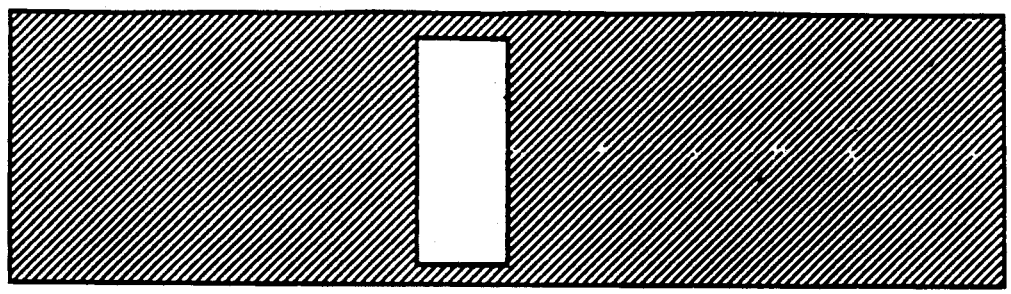
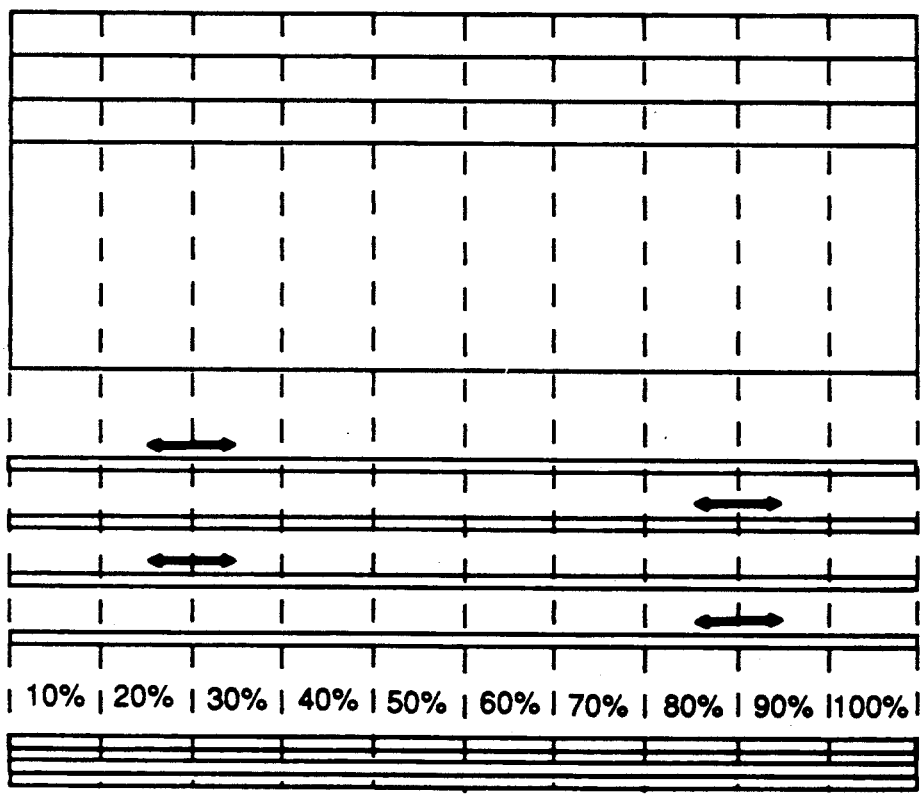
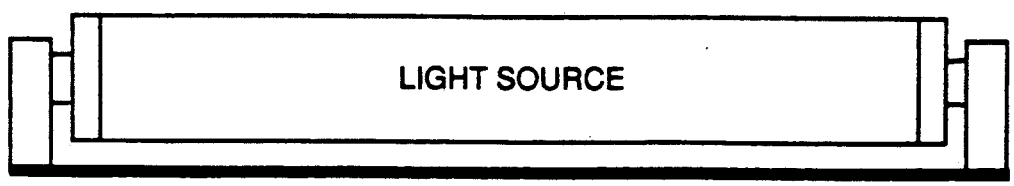
(FIGURE 1)

PROCESS COLOR SEPARATION GUIDE FOR COLOR TRANSPARENCIES

BACKGROUND AND SUMMARY OF THE INVENTION

Process color reproduction is restricted to the use of four colors: cyan, magenta, yellow, and black. A close examination of the color illustrations appearing in most printed material reveals that at most only these four color inks had been used. All variations of tones in the original must be reproduced as faithfully as possible by combinations of these four color inks.

Original art for color reproduction varies widely in quality and nature. It includes oil paintings, water colors, color prints of various kinds, and color transparencies. There are significant differences between these types of art, and it is essential that the designer be thoroughly familiar with the limitations of the reproduction processes as they relate to the different art forms.

Perhaps the most important distinction between types of copy is the difference between reflective copy, e.g., paintings and photographic prints, and transparencies, e.g., Kodachrome and Ektachrome. Reflective copy more nearly resembles the printed page; therefore, faithful reproduction can be more easily attained from reflective copy than from a transparency. In transparencies, several hundred times more light passes through the highlights than passes through the shaded areas. A transparency will always have more detail and brilliance than reflective copy.

a. Processing Color Reproductions

White paper reflects all colors falling on it and thus appears white. By coating the paper with ink in order to absorb some portion of light falling on it and thereby control the color of light reflected, it should be possible to duplicate the original piece of art. Printing ink on paper simply subtracts the amount of white light falling on the paper.

White light is a mixture of all colors, but for practical purposes, it may be considered as a combination of three colors, namely, red, green, and blue light. Each of the three colored printing inks absorbs one of the three components of the white light striking it and reflects the other two. Black ink absorbs all three colors and thus reflects little or no light.

b. The Four Process Inks

Cyan ink absorbs the red part of the white light. Where cyan is printed, only green and blue light is reflected so the color appears to be cyan, that is greenish blue.

Magenta ink absorbs the green part of the white light. Magenta ink reflects only blue and red which appear to give areas covered by it a magenta, that is blueish red.

Yellow ink absorbs the blue part of the white light and where it is printed only red and green light is reflected. Red light added to green gives the appearance of yellow.

Black ink absorbs all components of white light. Its main function in the printing process is to increase density range and to stabilize the appearance of multicolor reproductions.

Cyan, magenta, and yellow are called the complimentary colors because they absorb that portion of the white light traveling to, and reflect the light returning from the paper.

c. Producing Colors in the Printing Process

A printing press cannot vary the amount of ink applied to the printing plate in different areas. It must deposit a uniform film of ink over the entire surface of the plate. Therefore, halftones are used to deposit the correct amount of ink to give the proper color value. Color processing in printing is described in detail in "Graphic Master", Fourth Edition, 1988, authored by Dean Phillip Lem, which is incorporated herein by reference.

A glass screen is used in producing the halftone dots. For black and white, the glass screen is placed between the camera lens and the photograph. The screen is made up of vertical and horizontal lines etched in the glass. These lines may be from 65 lines per inch (coarse) to 150 lines per inch (very fine). When the camera shutter is tripped, the resulting negative is broken up into dots. The dots are so small that the viewer sees the pattern as a tone. The same dot principle is used in color reproduction to vary the amount of ink printed.

When all of the process colors are printed over the same area using the same size dot, the resulting color is gray. But, if any one is altered, then there will be a change in color. For example, a yellow ink (which reflects red and green) overprinted with equal parts of cyan (which reflects blue and green) will give the appearance of green.

d. Color Separation

Since only three colors, cyan, magenta and yellow, plus black, will be used for reproduction, there must be a way of separating the original art into the three color components plus black. Each printing plate, then, must be a record of either the blue, green and red light absorbed by the original art. This is because the cyan, magenta and yellow printing inks will absorb one of these components of white light when printed on paper.

Therefore, three separate photographic records must be made, one each of blue, green and red, of the light reflected by the original art or transmitted through the transparency. These records called separation negatives can be made by photographing the art through filters onto panchromatic film.

Separation negatives may be made on a process camera with a conventional lens, copy board, and negative film, or on an electronic color scanner.

Indirect Separations separates the color in the original copy into four unscreened, continuous-tone negatives or positives. These can then be enlarged or reduced when screened to produce any number of halftone separation negatives. Color can be corrected by masking before screening.

Direct Separation, often called direct screening, is the simplest method of color separation and correction. The copy is separated, screened and scaled in the same operation. Copy must be re-processed for every size needed.

Computerized Electronic Color Separation scanners have come into increasing use in recent years. They are emerging as the fastest, most controllable color separation method. As the scanner light beam passes over the original copy, it reads and evaluates the color image point by point. This visual image is converted to an electrical impulse and fed into a computer which analyzes it and makes necessary modifications for color separation, correction and reproduction.

e. Making Color Separations

In color work, it is necessary to isolate each color, cyan, magenta and yellow. To accomplish this, color filters are used on the camera. A red filter is used to separate the cyan, a green filter for the magenta, and a blue filter is used to isolate the yellow. A negative representing the black in the art work is made using a modified yellow/orange filter.

Although in theory three inks will accomplish the color reproduction task, it has been shown in practice that what appear to be blacks resulting from the three-color printing are not black but a dark brown. Furthermore, any slight variation in the amount of one or more of the three inks will result in substantial shifts in color appearance. The use of black as the fourth color, and removal of the black equivalent, the dark brown, from the other three plates, results in a more natural appearance of the reproduction.

Negatives used for exposing the image to the photoengraver's metal plate must be in halftone. When regular screen patterns overlay each other, an undesirable moire pattern results from the repetitive overlapping of the lines (dots) and open areas. This moire pattern is greatly minimized by placing the screens at different angles. There are only 90 degrees in which to make this adjustment. In four-color process printing, screen angles for the predominate colors should be separated by as great an angle as possible. The halftone dots are not superimposed over one another, but lie side by side with a minimum of overprinting. It is the human eye that does the color mixing.

In single color printing, a standard screen angle of 45° is used. At this angle, the halftone screen pattern is less noticeable to the eye and a uniform dot pattern along its edge is assured.

In process color printing usually the strongest color is screened at the standard 45° angle. Each of the other three colors are rotated. Magenta is screened at 75° and cyan at 105°. Yellow, the least noticeable, is sandwiched in between at 90°. The angles are illustrated in FIG. 1.

BRIEF DESCRIPTION OF THE DRAWINGS

FIG. 1 is the transparency color chart of the present invention. Each of the transparent screens is separate and can be combined by overlapping with other screens to achieve the desired color.

DETAILED DESCRIPTION OF THE INVENTION

In an advertising campaign, an original piece of art, a photograph, an oil or watercolor, or a print is melded to typeset copy. The Process Color Selector Guide (color chart) is used to match a particular color in the art. The match is then incorporated to a headline, frame or whatever the designer has in mind. There are many more variables the designer has to consider, but it will suffice to mention that which is pertinent.

As discussed above, when using an opaque piece of art, it is fairly simple to pick and match a particular color from the color chart because they are both reflective. It is quite different though, when working with the transparency. Because of the nature of the two, the color chart being reflective and the transparency able to transmit light, it is difficult to interpolate. Another drawback is the brilliance of the transparency and the flatness of the color chart. Because of these problems, applicant has devised a transparent color chart for use with transparencies.

With both the color chart and the transparency transmitting light, the designer is better able to correctly match the particular color. An example of the transparent color chart of the present invention is shown in FIG. 1, in which the four colors, mentioned above, are used with their screens from 10% to 90% in 10% increments, to solid.

Presently, when a designer has to match a color in a color transparency, the color transparency is projected onto a screen and the designer attempts to match the projected color on the screen with a color from a reflective color chart. In the process of the present invention, the color transparency is placed on a light table and is matched by placing one or more of the screen transparencies on the light table in a side-by-side comparison. The screen transparencies are interchanged until the designer is satisfied with the match. The result is a much closer match than can be obtained by the present method.

When a color is selected from the transparency to be matched, the designer will select from the transparency color chart, the colors that matches exactly to the transparency. The transparency, usually a slide, will be placed on a light table along with a set of pins backed up by clear acrylic. The designer selects the four colors and/or screens, places them on the pins and judges the color. The match is then used in the headline, body copy, or frame surrounding the transparency.

More specifically, the actual four-color process screens used in the printing industry are used in the design stage. The four colors, magenta, cyan, yellow and black with screens from ten percent to 90 percent, and also solid, as shown in FIG. 1, are selected to match a particular color or a complement of all the colors in the slide or transparency. By overlaying any one or more of the primary colors and/or their screens, the designer can specify those colors for the headline, body copy or a frame.

By overlaying up to four of the transparent screens, the designer can better match the actual color of the transparency.

What is claimed is:

1. A method for matching the color of a color transparency in the process of color printing comprising the steps of:
    (a) selecting from a series of screen transparencies of magenta, cyan, yellow and black graduated in a consistent progression of color gradation, at least one of said screen transparencies;
    (b) placing said screen transparency adjacent to said color transparency;
    (c) comparing the color of said screen transparency with the color of said color transparency; and
    (d) if necessary, sequentially repeating steps (a), (b) and (c) until the colors match.

2. The method of claim 8, wherein the screen transparencies are graduated in 10% increments.

3. The method of claim 1 wherein more than one of said screen transparencies are overlaid to form the resultant comparative screen transparency color.

4. A method for matching the color of a color transparency in the process of color printing comprising the steps of:
    (a) placing said color transparency on a light table;

(b) selecting from a series of screen transparencies of magenta, cyan, yellow and black graduated in a consistent progression of color graduation at least one of said screen transparencies;

(c) placing said selected screen transparency on said light table adjacent to said color transparency;

(d) comparing the color of said color transparency with the color of said screen transparency; and (e) if necessary, sequentially repeating steps (b), (c) and (d) until the color match.

5. The method of claim 4 wherein the screen transparencies are graduated in 10% increments.

6. The method of claim 4 wherein more than one of said screen transparencies are overlaid to form the resultant comparative screen transparency color.

* * * * *